United States Patent
McNeill et al.

(10) Patent No.: US 9,786,308 B1
(45) Date of Patent: Oct. 10, 2017

(54) INTERCONNECT INTERPOSER ATTACHABLE TO A TRAILING EDGE OF A SLIDER

(71) Applicant: Seagate Technology LLC, Cupertino, CA (US)

(72) Inventors: Kevin Anthony McNeill, Derry (GB); Lars Ahlen, Bloomington, MN (US); Jason Bryce Gadbois, Shakopee, MN (US); James Gary Wessel, Savage, MN (US); Bradley Ver Meer, Savage, MN (US)

(73) Assignee: SEAGATE TECHNOLOGY LLC, Cupertino, CA (US)

(*) Notice: Subject to any disclaimer, the term of this patent is extended or adjusted under 35 U.S.C. 154(b) by 0 days.

(21) Appl. No.: 15/175,327

(22) Filed: Jun. 7, 2016

(51) Int. Cl.
G11B 5/48 (2006.01)
G11B 5/31 (2006.01)

(52) U.S. Cl.
CPC .......... *G11B 5/4853* (2013.01); *G11B 5/4826* (2013.01); *G11B 5/314* (2013.01)

(58) Field of Classification Search
CPC ... G11B 5/6011; G11B 5/6064; G11B 5/4853; G11B 5/314; G11B 5/6088; G11B 5/105; G11B 5/4826
See application file for complete search history.

(56) References Cited

U.S. PATENT DOCUMENTS

| | | | | |
|---|---|---|---|---|
| 4,789,914 A | * | 12/1988 | Ainslie | G11B 5/3103 360/234.4 |
| 6,402,012 B1 | | 6/2002 | Bolduc | |
| 6,665,151 B1 | * | 12/2003 | Bonin | G11B 5/56 360/294.3 |
| 6,697,216 B2 | * | 2/2004 | Zeng | G11B 5/6005 360/99.19 |
| 6,757,135 B2 | | 6/2004 | Rancour et al. | |
| 7,643,248 B2 | * | 1/2010 | Sluzewski | G11B 5/314 360/234.4 |
| 7,829,990 B1 | * | 11/2010 | Scanlan | H01L 23/3107 257/686 |
| 7,929,248 B2 | * | 4/2011 | Zhu | G11B 5/102 360/234.5 |
| 7,957,085 B2 | * | 6/2011 | Tanaka | G11B 5/4826 360/125.31 |

(Continued)

*Primary Examiner* — Brian Miller
(74) *Attorney, Agent, or Firm* — Hollingsworth Davis, LLC

(57) ABSTRACT

A slider of a magnetic recording head comprises a media-facing surface, an upper surface opposing the media-facing surface, a leading edge, and a trailing edge. A plurality of electrical bond pads is disposed in a spaced-apart relationship on the trailing edge of the slider. An interconnect interposer is connected to the trailing edge of the slider. The interposer comprises a back side comprising a plurality of electrical contacts in contact with the plurality of bond pads on the trailing edge of the slider. The interposer also comprises a front side comprising a plurality of electrical interposer pads corresponding in number to the plurality of electrical contacts on the back side. The interposer further comprises a plurality of conductors each of which electrically couples one of the plurality of electrical contacts on the back side with one of the plurality of interposer pads on the front side.

18 Claims, 10 Drawing Sheets

(56) References Cited

U.S. PATENT DOCUMENTS

| | | | | |
|---|---|---|---|---|
| 8,107,185 B2* | 1/2012 | Okamoto | G11B 5/3136 | 360/244.1 |
| 8,107,192 B2* | 1/2012 | Sasaki | G11B 5/1278 | 360/125.07 |
| 8,227,925 B2* | 7/2012 | Song | H01L 23/3185 | 257/777 |
| 8,259,415 B2 | 9/2012 | Hutchinson et al. | | |
| 8,299,594 B2* | 10/2012 | Michaels | H01L 25/105 | 257/686 |
| 8,328,068 B2 | 12/2012 | Azdasht et al. | | |
| 8,339,906 B2* | 12/2012 | Seigler | B82Y 20/00 | 369/112.27 |
| 8,395,971 B2* | 3/2013 | Sasaki | G11B 5/314 | 369/13.02 |
| 8,406,089 B2* | 3/2013 | Sasaki | G11B 5/314 | 369/13.02 |
| 8,477,457 B2* | 7/2013 | Matsumoto | G11B 5/4826 | 360/234.5 |
| 8,488,435 B2* | 7/2013 | Snyder | G02B 6/4206 | 369/112.27 |
| 8,587,901 B1 | 11/2013 | Puttichaem et al. | | |
| 8,624,372 B2* | 1/2014 | Hetzel | H01L 23/3128 | 257/686 |
| 8,705,324 B2* | 4/2014 | Shivarama | G11B 13/04 | 369/112.27 |
| 8,749,074 B2* | 6/2014 | Eskildsen | H01L 23/3107 | 257/100 |
| 8,817,423 B2* | 8/2014 | McCaslin | G11B 5/4833 | 360/234.5 |
| 8,823,156 B2* | 9/2014 | Hsieh | H01L 23/3128 | 257/686 |
| 8,854,772 B1* | 10/2014 | Setiadi | G11B 5/4873 | 360/294.4 |
| 8,902,547 B1* | 12/2014 | Zhong | G11B 5/4853 | 360/234.5 |
| 8,934,200 B2 | 1/2015 | Shivarama et al. | | |
| 8,964,402 B2* | 2/2015 | Nakanishi | H05K 3/3436 | 174/260 |
| 8,994,170 B2* | 3/2015 | Crisp | H01L 24/06 | 257/724 |
| 9,042,048 B1* | 5/2015 | Brothers | B23K 1/0006 | 360/59 |
| 9,053,731 B2* | 6/2015 | Hirano | G11B 5/3106 | |
| 9,070,387 B1* | 6/2015 | Demtchouk | G11B 5/314 | |
| 9,099,145 B1* | 8/2015 | Bin | G11B 5/314 | |
| 9,105,282 B1* | 8/2015 | Puttichaem | B23K 1/0016 | |
| 9,123,600 B2* | 9/2015 | Haba | H01L 24/49 | |
| 9,171,562 B1* | 10/2015 | Puttichaem | G11B 5/4866 | |
| 9,202,478 B1* | 12/2015 | Demtchouk | B23K 35/3013 | |
| 9,257,138 B1* | 2/2016 | Ouyang | G11B 5/4826 | |
| 9,297,971 B2* | 3/2016 | Thacker | G02B 6/4274 | |
| 9,315,008 B1* | 4/2016 | Lim | B32B 41/00 | |
| 9,368,139 B1* | 6/2016 | Sedklang | G11B 5/4826 | |
| 9,431,037 B2* | 8/2016 | Kozlovsky | G11B 5/314 | |
| 2002/0196997 A1* | 12/2002 | Chakravorty | G02B 6/42 | 385/14 |
| 2008/0218891 A1* | 9/2008 | Gubbins | G11B 5/3133 | 360/59 |
| 2015/0201493 A1 | 7/2015 | Shivarama et al. | | |

* cited by examiner

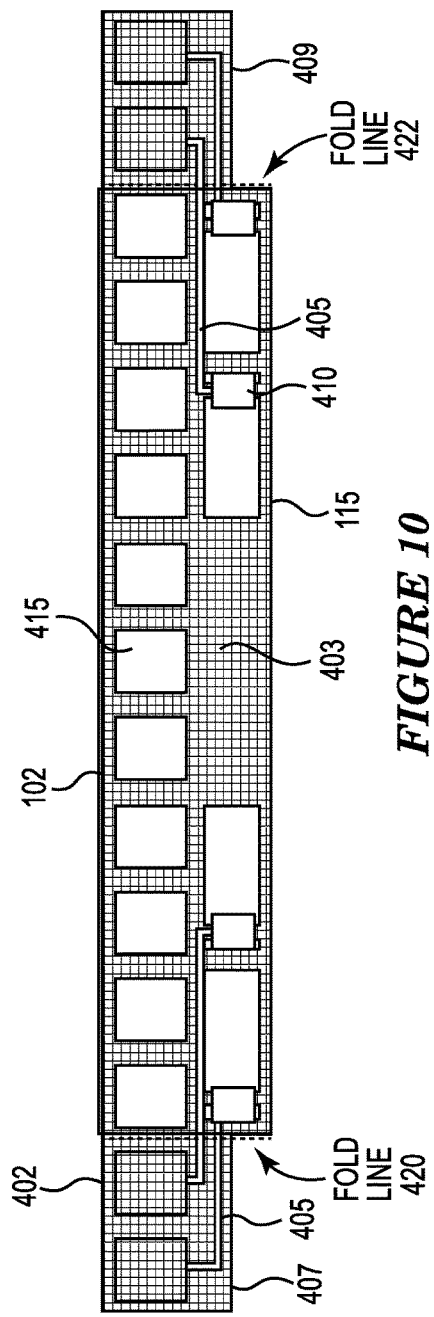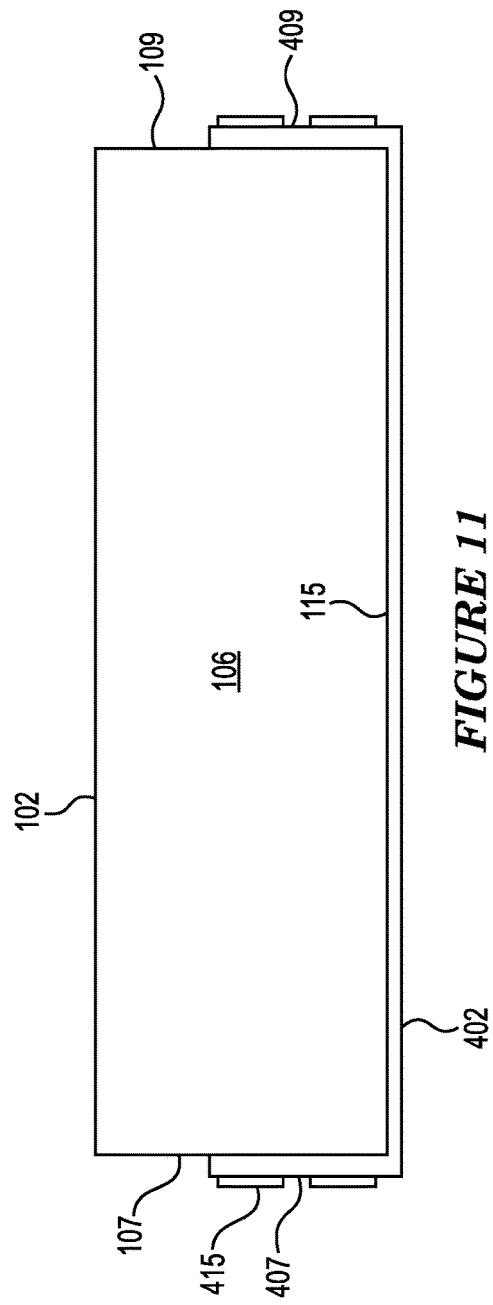

INTERCONNECT INTERPOSER ATTACHABLE TO A TRAILING EDGE OF A SLIDER

SUMMARY

Embodiments of the disclosure are directed to an apparatus comprising a slider of a magnetic recording head. The slider comprises a media-facing surface, an upper surface opposing the media-facing surface, a leading edge, and a trailing edge. A plurality of electrical bond pads is disposed in a spaced-apart relationship on the trailing edge of the slider. An interconnect interposer is connected to the trailing edge of the slider. The interposer comprises a back side comprising a plurality of electrical contacts in contact with the plurality of bond pads on the trailing edge of the slider. The interposer also comprises a front side comprising a plurality of electrical interposer pads corresponding in number to the plurality of electrical contacts on the back side. The interposer further comprises a plurality of conductors each of which electrically couples one of the plurality of electrical contacts on the back side with one of the plurality of interposer pads on the front side.

Other embodiments are directed to an apparatus comprising a slider of a magnetic recording head. The slider comprises a media-facing surface, an upper surface opposing the media-facing surface, a leading edge, and a trailing edge. A plurality of electrical bond pads is disposed in a spaced-apart relationship on the trailing edge of the slider. At least some of the bonds pads are situated in an upper region of the trailing edge, and at least some of the bond pads are situated in a lower region of the trailing edge. An interconnect interposer is connected to the trailing edge of the slider. The interposer comprises a back side comprising a plurality of electrical contacts in contact with the plurality of bond pads in the upper and lower regions of the trailing edge of the slider. The interposer also comprises a front side comprising a plurality of electrical interposer pads corresponding in number to the plurality of electrical contacts on the back side. The interposer further comprises a plurality of conductors each of which electrically couples one of the plurality of electrical contacts on the back side with one of the plurality of interposer pads on the front side.

The above summary is not intended to describe each embodiment or every implementation. A more complete understanding will become apparent and appreciated by referring to the following detailed description and claims in conjunction with the accompanying drawings.

BRIEF DESCRIPTION OF THE DRAWINGS

FIG. 10 is a front view of an interconnect interposer in accordance with various embodiments;

FIG. 11 illustrates the interposer shown in FIG. 10 connected to the trailing edge of a slider;

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to magnetic recording devices used for data storage. Data storage systems may include one or more transducers that respectively write, via a writer, and read, via a reader, information to and from a magnetic storage medium. The reader and writer are components disposed on an aerodynamic slider of the magnetic recording transducer. It is typically desirable to have a relatively small distance or separation between a transducer and its associated media. This distance or spacing is referred to as head-media separation. By reducing the head-media separation, writers and readers are generally better able to write and read data to and from a recording medium, allowing for an increase in storage capacity (e.g., tracks per inch or bits per inch). Reduced head-media separation can be achieved, in part, by reducing the size of the slider. Reducing the size of the slider, however, results in a reduction in the size of, and spacing between, electrical bond pads that are disposed on the trailing edge of the slider. These electrical bond pads provide electrical connections between the various components of the slider and electrical conductors of a trace gimbal assembly (TGA) of HGA that supports the slider.

Continued advancement of slider technology has led to an increase in the number of components on the slider, thereby resulting in a need for a greater number of bond pads at the trailing edge of the slider. Heat-assisted magnetic recording (HAMR), two-dimensional magnetic recording (TDMR), and multi-signal magnetic recording (MSMR), for example, require that additional components be added to the slider. These additional components require additional bond pads at the trailing edge of the slider. The current trend of reducing the size of the slider, while at the same time increasing the number of slider components, significantly complicates the electrical interconnect strategy between the bond pads of the slider and the electrical contacts/conductors of the TGA.

For example, a technique known as laser solder jetting is typically used to establish electrical connections between individual bond pads at the trailing edge of the slider and individual electrical contacts/conductors of the TGA. Laser solder jetting involves high precision placement of solder balls at an electrical connection site with laser reflow. Laser solder jetting requires that the bond pads of the slider be in close proximity to the contacts/conductors of the TGA. As such, the bond pads of a typical slider are situated along the upper region of the slider's trailing edge proximate the TGA. Consequently, the lower region of the slider's trailing edge do not include bond pads, as these distant bond pads would be too far away from the TGA for laser solder jetting to be viable.

Figure 1:
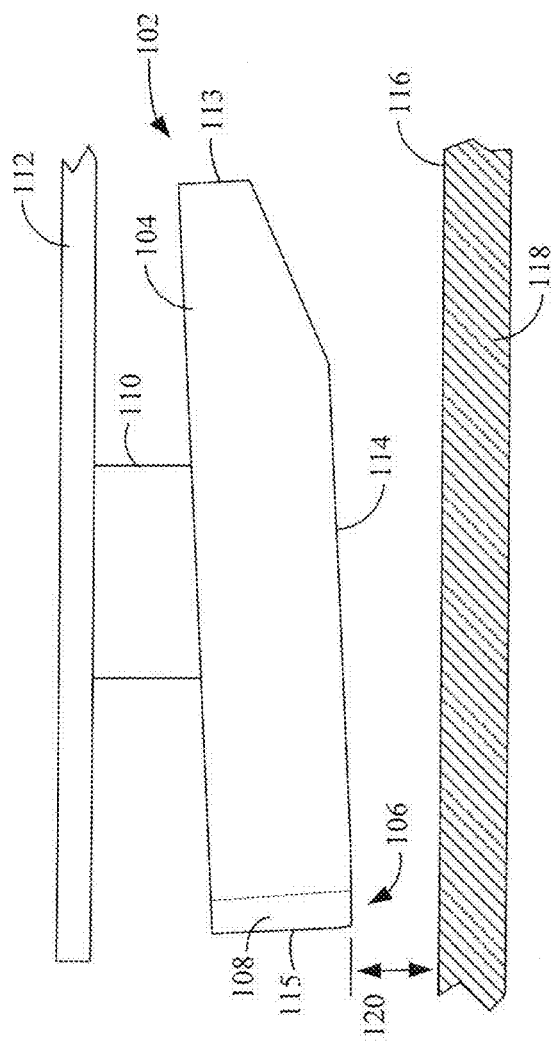
FIG. 1 is a schematic representation of a slider in which the various embodiments disclosed herein may be implemented.

Turning now to FIG. 1, a side view of a representative slider 102 is illustrated. The slider 102 includes a slider body 104 having a leading edge 113, a trailing edge 115, and an air bearing surface (ABS) 114 (also referred to as a media-facing surface) between the leading and trailing edges 113 and 115. The slider 102 also includes a transducer portion 106 provided within overcoat 108 at the trailing edge 115 of the slider 102. The transducer portion 106 includes various components of the slider 102 (one or more readers, writers, heaters, sensors, etc.). A set of electrical bond pads (not shown) are also provided at the trailing edge 115 of the slider 102. The slider 102 is attached via suspension 110 to an arm 112. The ABS 114 of the slider 102 is shown proximate the surface 116 of a magnetic recording medium 118. During operation, a fly height 120 is maintained between the slider 102 and the disk 118.

Figure 2A:
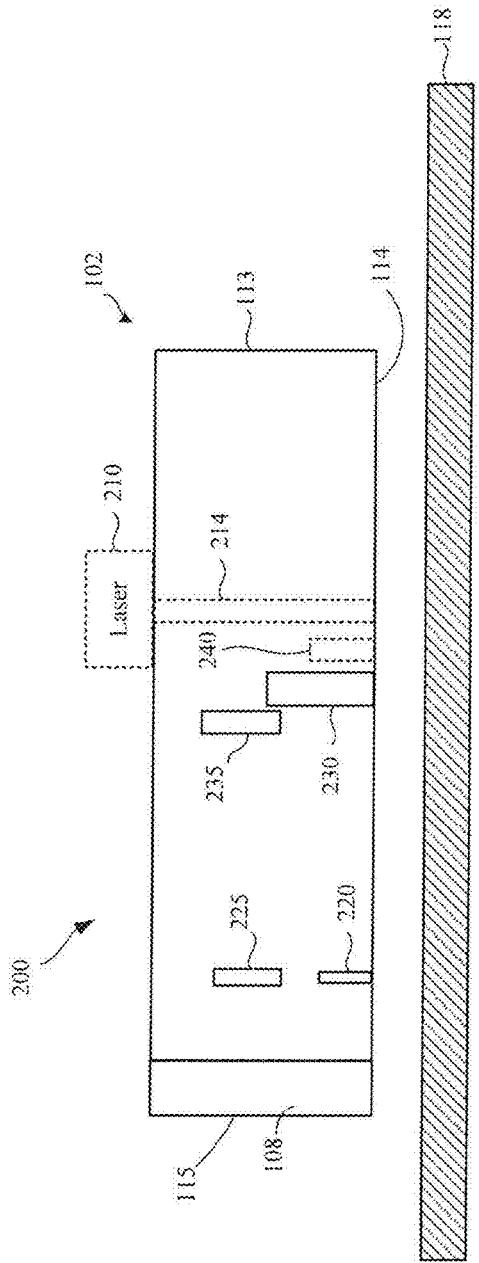
FIG. 2A is a schematic representation of a slider in which the various embodiments disclosed herein may be implemented.

FIG. 2A shows a recording head arrangement 200 in accordance with various embodiments. The recording head arrangement 200 includes a slider 102 positioned proximate a rotating magnetic recording medium 118. The slider 102 includes a reader 220 and a writer 230 proximate the ABS 114 for respectively reading and writing data from/to the magnetic recording medium 118. The writer 230 includes a corresponding heater 235, and the reader 220 also includes a corresponding heater 225 according to various embodiments. The writer heater 235 can be powered to cause protrusion of the ABS 114 predominately in the ABS region at or proximate the writer 230 and the reader heater 225 can be powered to cause protrusion of the ABS 114 predominately in the ABS region at or proximate the reader 220. Activation of both the writer and reader heaters 235 and 225 causes protrusion of the pole tip region of the slider 102. Power can be controllably delivered independently to the heaters 225 and 235 to adjust the fly height (e.g., clearance) of the slider 102 relative to the surface of the recording medium 118. It is understood that the slider 102 can include multiple readers and multiple writers (with corresponding heaters).

According to some embodiments, the recording head arrangement 200 can be configured for heat-assisted magnetic recording. HAMR generally refers to the concept of locally heating a magnetic recording medium to reduce coercivity at the heated location. This allows the applied magnetic writing fields to more easily direct the magnetization during the temporary magnetic softening of the medium caused by the heat source. HAMR allows for the use of small grain media, with a larger magnetic anisotropy at room temperature to assure sufficient thermal stability, which is desirable for recording at increased areal densities. HAMR can be applied to any type of magnetic storage media including tilted media, longitudinal media, perpendicular media, and patterned media. By heating the media, the coercivity is reduced such that the magnetic write field is sufficient to write to the media. Once the media cools to ambient temperature, the coercivity has a sufficiently high value to assure thermal stability of the recorded information.

In order to achieve desired data density, a HAMR recording head includes optical components that direct light from a light source 210, such as a laser diode, to the recording medium 118 via an optical waveguide 214. The light source 210 can be mounted external, or integral, to the slider 102. It is desirable that the HAMR media hotspot be smaller than a half-wavelength of light available from current sources (e.g., laser diodes). Due to what is known as the diffraction limit, optical components cannot focus the light at this scale. One way to achieve tiny confined hot spots is to use an NFT 240, such as a plasmonic optical antenna. The NFT 240 is designed to support local surface-plasmon at a designed light wavelength. At resonance, high electric field surrounds the NFT 240 due to the collective oscillation of electrons in the metal. Part of the field will tunnel into the medium 118 and get absorbed, raising the temperature of the medium locally for recording.

During recording, a write pole of the writer 230 applies a magnetic field to the heated portion of the medium 118. The heat lowers the magnetic coercivity of the media, allowing the applied field to change the magnetic orientation of heated portion. The magnetic orientation of the heated portion determines whether a one or a zero is recorded. By varying the magnetic field applied to the magnetic recording medium 118 while it is moving, data is encoded onto the medium 118. It is understood that embodiments of the disclosure may be implemented in a wide variety of recording heads, including those configured for conventional magnetic recording or HAMR.

The slider 102 includes a number of bond pads (not shown in FIG. 2A, but see FIG. 2B) on the trailing edge 115 of the slider 102. These bond pads are connected through the overcoat 108 to various components, e.g., reader(s), writer(s), heaters, sensors, etc. of the slider 102. During fabrication of a slider 102, the bond pads are electrically connected to the electrical connections (e.g., traces) along the suspension 110 (shown in FIG. 1). The current industry standard provides for nine bond pads on the trailing edge 115 of the slider 102.

Figure 2B:
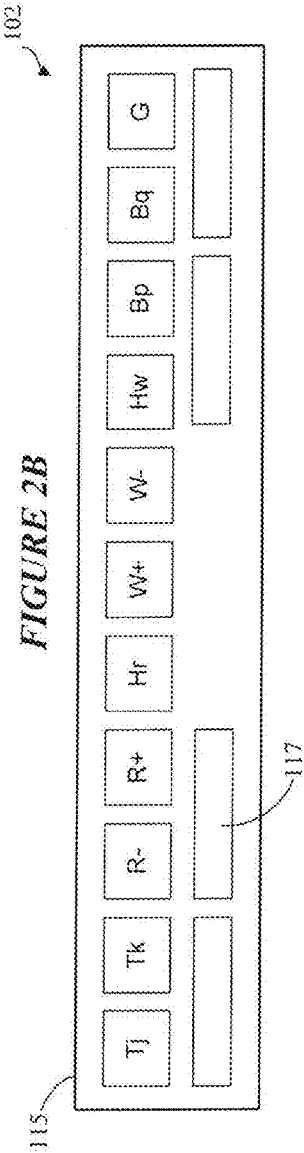
FIG. 2B is a view of the trailing edge of a slider configured for heat-assisted magnetic recording (HAMR), the trailing edge including an arrangement of electrical bond pads.

FIG. 2B is a view of the trailing edge 115 of a slider 102 configured for heat-assisted magnetic recording. The trailing edge 115 of the HAMR slider 102 shown in FIG. 2B includes 11 bond pads, including bond pads R+ and for a reader, W+ and W− for a writer, GND for ground (which defines the ground potential of the slider body 102), Tj and Tk for a dual-ended temperature sensor (e.g., a dual-ended coefficient of resistance temperature sensor or DETCR), Hw and Hr for the writer and reader heaters, respectively, and Bp and Bq for a bolometer (e.g., laser power monitor). A number of electronic lapping guides (ELGs) 117 are also shown on the trailing edge 115 of the slider 102. Advanced sliders will need to accommodate a greater number of bond pads (e.g., >9 bond pads) as more components are added to the sliders.

Figure 3A:
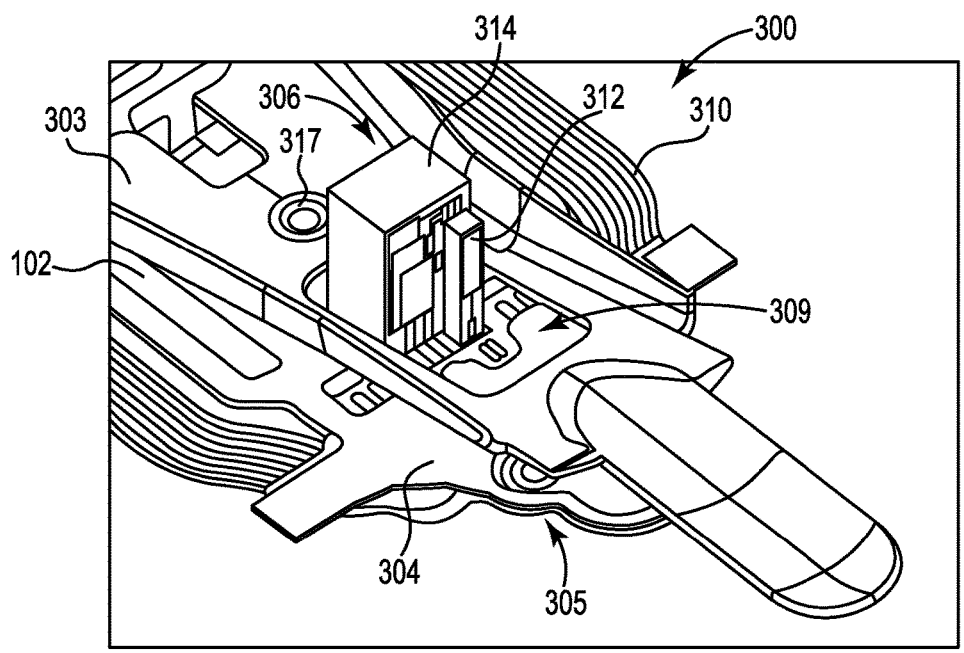
FIG. 3A is a top perspective view of a distal portion of a head gimbal assembly (HGA) that includes a slider and laser diode unit supported by a suspension in accordance with embodiments of the disclosure.
Figure 3B:
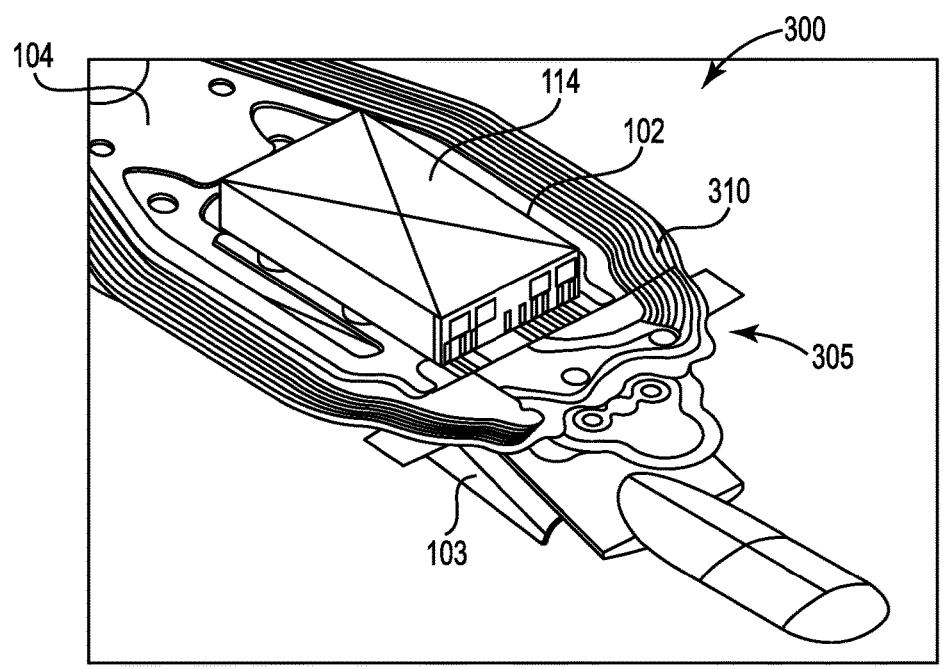
FIG. 3B is a bottom perspective view of the HGA shown in FIG. 3A.

FIG. 3A is a top perspective view of a head gimbal assembly 300 which includes a load beam 303, a suspension 304 connected to the load beam 303 of the hard drive's actuator assembly, and a TGA 305 connected to the suspension 304. A slider 102 and laser diode unit 306 are supported by the suspension 304. The laser diode unit 303 comprises a laser diode 312 connected to a submount 314. FIG. 3B is a bottom perspective view of the portion of the HGA 300 shown in FIG. 3A.

The slider 102 is best seen in the bottom perspective view of FIG. 3B, with the air bearing surface 114 defining the lower surface of the slider 102. The slider 102 is mounted to the suspension 304 which is connected to the load beam 303 at a single connection point 317, such as at a dimple connection. The single connection point 317 allows the slider 102 to articulate along multiple axes, such as a pitch axis and a roll axis, during operation. The load beam 303 includes an aperture 309 through which the LDU 306 protrudes, which allows for free movement of the LDU 306 as the suspension 304 is subject to aerodynamic forces and displacement during operation. A flex circuit arrangement 310 provides electrical connectivity between electrical bond pads of the slider 102 and various electronics of the hard drive.

Figure 4:
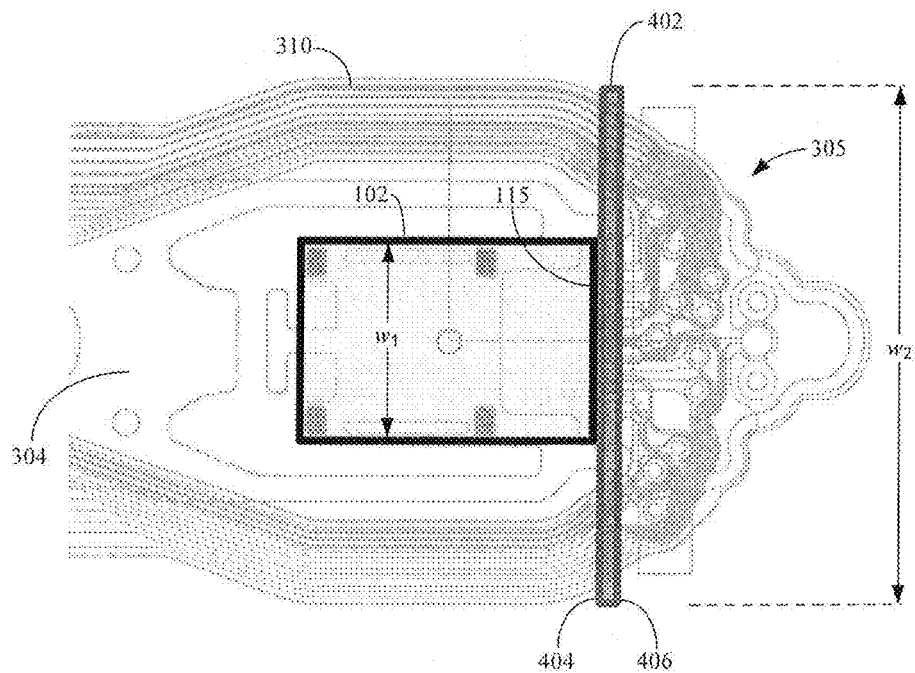
FIG. 4 illustrates an interconnect interposer arrangement in accordance with various embodiments.

FIG. 4 illustrates an interconnect interposer arrangement in accordance with various embodiments. FIG. 4 shows a representative TGA 305 which includes a slider 102 connected to a suspension 304. An interconnect interposer 402 is shown connected to the trailing edge 115 of a slider 102 and to various electrical conductors 310 of the TGA 305. More particularly, the interposer 402 includes a backside 404 with contacts that electrically connect with bond pads on the trailing edge 115 of the slider 102. The interposer 402 also includes a front side 406 which includes interposer pads that electrically connect with electrical contacts of the TGA 305. The electrical contacts of the TGA 305 are connected to the flex conductors 310 that convey electrical signals between the slider 102 and various electronics of the hard drive.

The slider 102 has a width, $w_1$, in the cross-track direction and the interposer 402 has a width, $w_2$, also in the cross-track direction. According to various embodiments, the slider 102 can have a width, $w_1$, of about 700 µm. In the representative embodiment shown in FIG. 4, the width, $w_2$, of the interposer 402 is illustrated to have a maximum width that is coextensive with the width of the TGA footprint. It is desirable that the width, $w_2$, of the interposer 402 be constrained within the TGA footprint so as not to adversely impact the usable area of the magnetic recording medium. According to various embodiments, the interposer 402 can have a width, $w_2$, of between about 1.5 and three times the slider's width, $w_1$ (e.g., 1.5-2 mm). As will be described hereinbelow, the width, $w_2$, of the interposer 402 can be less than that shown in FIG. 4 in view of potential windage concerns. In some embodiments, the width, $w_2$, of the interposer 402 is about equal to the width, $w_1$, of the slider 102, with portions of the interposer 402 wrapping around one or both of the sides and upper surface of the slider 102. It is noted that the peripheral wings of the interposer 402 that extend beyond the trailing edge 115 of the slider 102 can be shaped to create an airfoil to reduce windage problems.

Figure 5:
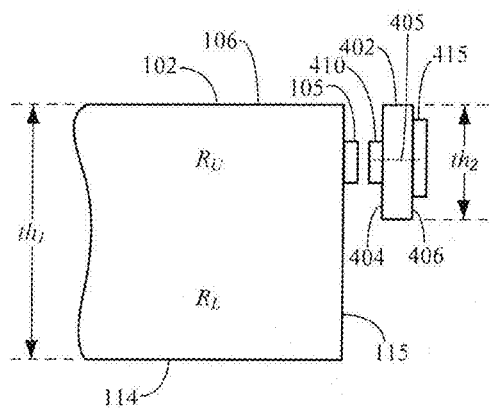
FIG. 5 is a side view of a trailing edge portion of the slider which includes an interconnect interposer in accordance with various embodiments.

FIG. 5 is a side view of a trailing edge portion of the slider 102 which includes an interconnect interposer 402 in accordance with various embodiments. The trailing edge 115 of the slider 102 is shown to include a row of spaced-apart electrical bond pads 105, a single one of which is shown in the side view of FIG. 5. A row of spaced-apart electrical contacts 410 on the backside 404 of the interposer 402 is configured to electrically connect with a corresponding row of electrical bond pads 105 on the trailing edge 115 of the slider 102. Each of the electrical contacts 410 of the interposer 402 is configured to electrically connect with a corresponding bond pad 105 on the trailing edge 115 of the slider. The electrical contacts 410 of the interposer 402 can be formed from Au or other good conductive material (e.g., Cu).

The interposer 402 includes a row of spaced-apart interposer pads 415 disposed on the front side 406 of the interposer 402. Each interposer pad 415 on the front side 406 of the interposer 402 has a corresponding electrical contact 410 on the backside of the interposer 402. The interposer pads 415 are preferably formed from Au, but can be formed from any good conductive material (e.g., Cu). An electrical conductor 405 (e.g., a trace) is disposed within the interposer 402 and electrically connects one of the electrical contacts 410 on the backside of the interposer 402 with a corresponding one of the interposer pads 415 on the front side 406 of the interposer 402.

As can be seen in FIG. 5, the electrical contact 410 on the backside 404 of the interposer 402 has a size that is roughly equivalent to that of its corresponding bond pad 105 on the trailing edge 115 of the slider 102. It can also be seen in FIG. 5 that the interposer pad 415 on the front side 406 of the interposer 402 is significantly larger (e.g., has a greater surface area) than its corresponding electrical contact 410 on the back side 404 of the interposer 412. Moreover, the spacing between adjacent interposer pads 415 on the front side 406 of the interposer 402 is greater than the spacing between adjacent bond pads 115 (and corresponding electrical contacts 410) on the trailing edge 115 of the slider 102.

For example, a typical bond pad 105 for a slider having a width ($w_1$) of about 700 µm can have a surface area of about 1200 µm² (e.g., 24 µm×50 µm) to about 3600 µm² (e.g., 45 µm×80 µm). Typical spacing (pitch) between adjacent bond pads 105 can range between about 30 and 80 µm. According to various embodiments, an interposer pad 415 can have a surface area of about 1800 to 4000 µm². Spacing (pitch) between adjacent interposer pads 415 can range between about 60 and 100 µm.

Table 1 below provides various bond pad dimensions that vary depending on the number of bond pads 105 (between 9 and 13 in this illustrative example) provided on the trailing edge 115 of a slider 102 having a width ($w_1$) of about 700 µm. As can be seen in Table 1, the various bond pad dimensions generally decrease as the number of bond pads increases. The dimensions shown in Table 1 are for illustrative non-limiting purposes, and can impact the size and placement of the electrical contacts 410 on the back side 404 of the interposer 402.

TABLE 1

| # of Bond Pads | Bond Pad Width (µm) | Space Between Bond Pads (µm) | Pad-to-Pad Pitch (µm) | Bond Pad Height (µm) | |
|---|---|---|---|---|---|
| 9 | 45 | 32.5 | 77.5 | | 64 |
| 10 | 38 | 32.2 | 70 | 64 | 80 |
| 11 | 35 | 28 | 63 | 64 | 80 |
| 11 | 32 | 31 | 63 | 64 | 80 |
| 12 | 32 | 25 | 57 | 64 | 80 |
| 13 | 28 | 25 | 53 | 64 | 80 |

Figure 7:
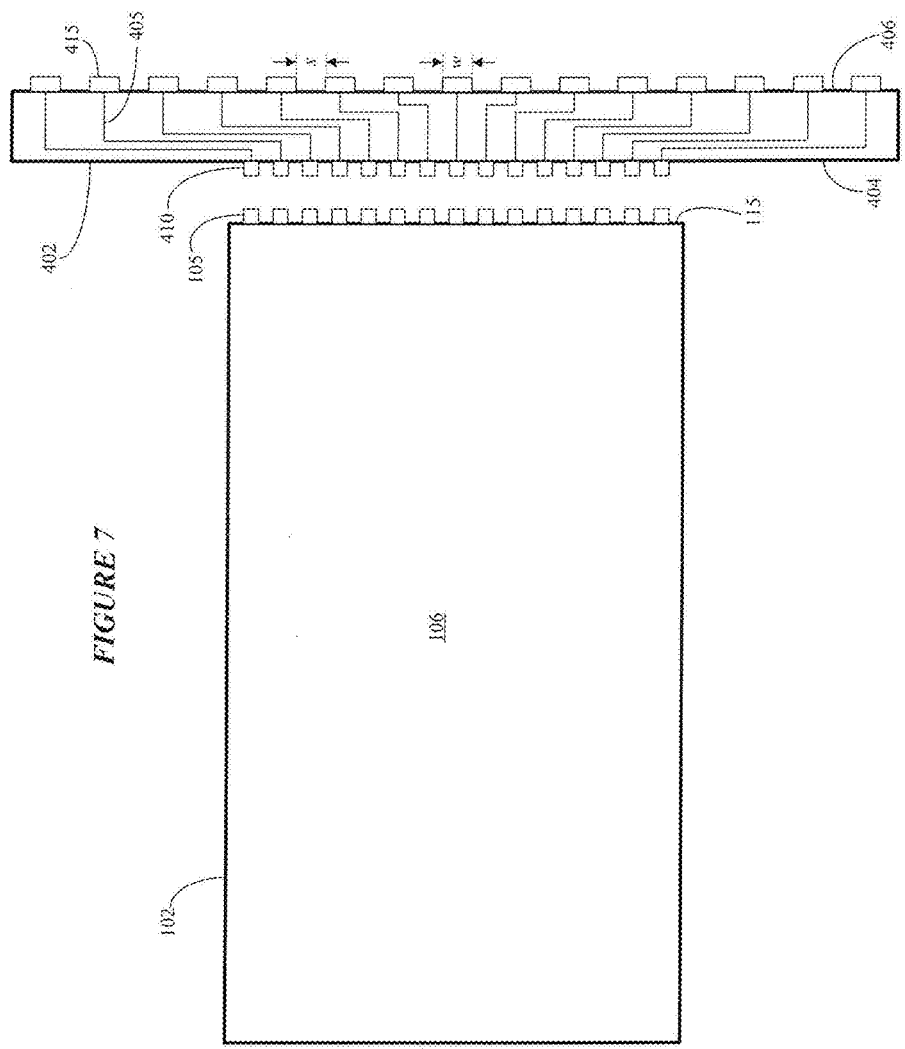
FIG. 7 is a top view of a slider and interposer arrangement in accordance with various embodiments.

It can be readily appreciated that the increased size of and spacing between interposer pads 415 relative to the slider bond pads 105 significantly decreases bond pad density by effectively spreading out the slider bond pads through use of the interposer 402 (see, e.g., FIG. 7). This reduction in bond pad density greatly simplifies the connection strategy between the bond pads 105 of the slider 102 and the conductors 310 of the TGA 305, allowing use of standard IC technology during fabrication. Moreover, the larger surface area of the interposer 402 relative to that of the trailing edge 115 of the slider 102 provides the opportunity to increase the number of bond pads 105 while reliably establishing electrical connections between the bond pads 105 and connections of the TGA 305 (e.g. by using solder jetting).

As is shown in FIG. 5, the slider 102 has a thickness, $th_1$, that can range between about 160 and 230 μm. With respect to the thickness dimension $th_1$, the slider 102 includes an upper region ($R_U$) and a lower region ($R_L$). Using conventional fabrication techniques and in the absence of an interposer 402, the bond pads 105 must reside in the upper region, $R_U$, of the slider 102 in order to be sufficiently close to the TGA contacts for solder jetting to be viable. For example, the bond pads 105 must be positioned between about 0-5 μm away from the TGA contacts in order for solder jetting to be used to establish electrical connections therebetween. When an interposer 402 is used in combination with the slider 102, the spacing tolerance between the interposer pads 415 and the TGA contacts can be relaxed. For example, the interposer pads 415 can be positioned between about 0-15 μm away from the TGA contacts in order for solder jetting to be used to establish electrical connections therebetween.

In FIG. 5, the interposer 402 is shown to have a thickness, $th_2$. In the embodiment shown in FIG. 5, the thickness, $th_2$, of the interposer 402 is less than or equal to the thickness of the upper region, $R_U$, of the slider 102. For example, if the upper region, $R_U$, of the slider 102 constitutes the upper half or upper third of the slider 102 (½*$th_1$ or ⅓*$th_1$), then standard IC technology (e.g., laser solder jetting) can be used to electrically connect the interposer 402 to the TGA 305. In other words, as long as the interposer pads 415 reside in the upper half or upper third of the slider's thickness, the interposer 402 can be electrically connected to the TGA 305 using standard IC technology. It is noted that the thickness, $th_2$, of the interposer 402 can vary, and that the distance between the interposer pads 415 and the TGA contacts are tightly constrained.

Figure 6:
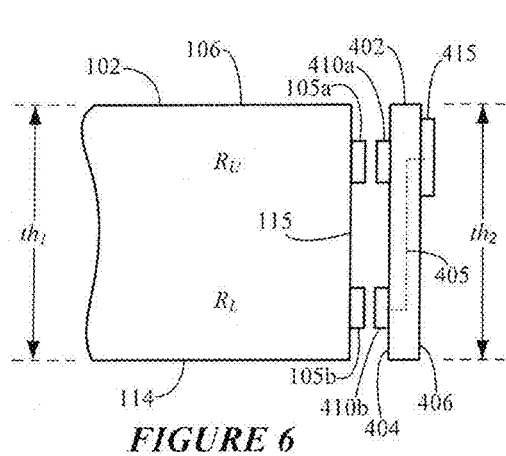
FIG. 6 illustrates another configuration of an interconnect interposer in accordance with various embodiments.

In the embodiment shown in FIG. 5, the interposer 402 is configured to facilitate electrical connection with bond pads 105 disposed within the upper region, $R_U$, of the slider 102. As such, the row of bond pads 105 on the trailing edge 115 of the slider 102 and the row of electrical contacts 410 of the interposer 402 are situated within or aligned with the upper region, $R_U$, of the slider 102. FIG. 6 illustrates another embodiment of an interconnect interposer 402 that can effectively transpose bond pads or contacts of electrical elements of the slider 102 positioned within the lower region, $R_L$, of the slider 102 to interposer pads 415 positioned within the upper region, $R_U$, of the slider 102. In the embodiment shown in FIG. 6, the trailing edge 115 of the slider 102 includes a row of bond pads 105a situated in the upper region, $R_U$, of the slider 102. The trailing edge 115 of the slider 102 also includes one or more bond pads or electrical contacts or elements 105b positioned within the lower region, $R_L$, of the slider 102. Generally, the bond pads or electrical contacts/elements 105b within the lower region, $R_L$, are arranged in a row, but could instead be staggered, for example (as can be the bond pads 105a within the upper region, $R_U$). The interposer 402 shown in FIG. 6 has a thickness, $th_2$, that can be about the same as the thickness, $th_1$, of the slider 102.

In the embodiment shown in FIG. 6, the interposer 402 includes a row of upper electrical contacts 410a and a row of lower electrical contacts 410B disposed on the backside 404 of the interposer 402. The row of upper electrical contacts 410a of the interposer 402 is configured to electrically connect with a row of upper bond pads 105a on the trailing edge 115 of the slider 102. The row of lower electrical contacts 410b of the interposer 402 is configured to electrically connect with a row of lower bond pads 105b or electrical elements on the trailing edge 115 of the slider 102. The interposer 402 includes a row of interposer pads 415 positioned within the upper region of the interposer 402 (e.g., aligned within the upper region, $R_U$, of the slider 102).

The interposer 402 includes an interposer pad 415 on the front side 406 of the interposer 402 for each lower electrical contact/element 410b positioned on a lower portion of the backside 404 of the interposer 402. An electrical conductor 405 (e.g., a trace) is disposed within the interposer 402 and electrically connects each lower electrical contact/element 410b on the backside 404 with its corresponding interposer pad 415 on the front side 406. As such, each lower electrical contact 410b on the backside 404 of the interposer 102 is effectively transposed to an interposer pad 415 positioned within the upper region of the interposer 402 (e.g., within the top ½ or ⅓ of the slider's thickness).

FIG. 7 is a top view of a slider and interposer arrangement in accordance with various embodiments. In FIG. 7, the slider 102 is shown to include a top surface 106 which is adjacent the lower surface of the TGA 305 (suspension 304) shown in FIG. 4. In the embodiment shown in FIG. 7, the slider 102 includes a row of 15 bond pads 105 disposed in a spaced-apart relationship at the trailing edge 115 of the slider 102. It is understood that the trailing edge 115 of the slider 102 can include any number of bond pads (e.g., up to about 25 or 30 in one or two rows) and that the 15 bond pads shown and arranged in FIG. 7 is for illustrative, non-limiting purposes only. As was discussed previously, the bond pads 105 are positioned in the upper region of the trailing edge 115 biased toward the top surface 106 of the slider 102.

FIG. 7 also shows an interconnect interposer 402 having a backside 404 and a front side 406. A row of electrical contacts 410 are disposed on the backside 404 of the interposer 402 and a row of interposer pads 415 are disposed on the front side 406 of the interposer 402. As can be seen in FIG. 7, each bond pad 105 of the slider 102 is aligned with a corresponding electrical contact 410 of the interposer 402. During fabrication, the trailing edge 115 of the slider 102 and the backside 404 of the interposer 402 are brought together so that corresponding bond pads 105 and electrical contacts 410 can be soldered together, such as by use of a reflow soldering process. For example, solder bumps can be applied to the electrical contacts 410 of the interpose 402 and/or the bond pads 105 of the slider 102. With the slider 102 and interposer 402 in close alignment, heat is applied to melt the solder, with wetting forces pulling the two components into full alignment. Solder jetting can also be employed if the interposer contacts 410 have through-holes that enable solder jetting to reach the bond pads 105.

Each of the electrical contacts 410 on the backside 404 of the interposer 402 is electrically connected to one of the interposer contacts 415 on the front side 406 of the interposer 102 via an electrical conductor 405 (e.g., like traces of a PCB board). As was discussed previously, the increased size of and spacing between interposer pads 415 relative to the slider bond pads 105 significantly decreases bond pad density by effectively spreading out the slider bond pads through use of the interposer 402. For example, the interposer pads 415 can have a width, w, of between about 20 and 40 μm, a surface area between about 1800 and 4000 μm², and a spacing, s, of between about 20 and 40 μm. The interposer pads 415 serve as relatively large targets when electrically connecting the interposer pads 415 to contacts or conductors of the TGA 305 using a laser solder jetting technique. The surface area of, and spacing between (e.g. pitch), the interposer pads 415 of an interposer 402 of the present disclosure can readily accommodate the size and pitch requirements of conventional solder jetting techniques.

Figure 8:
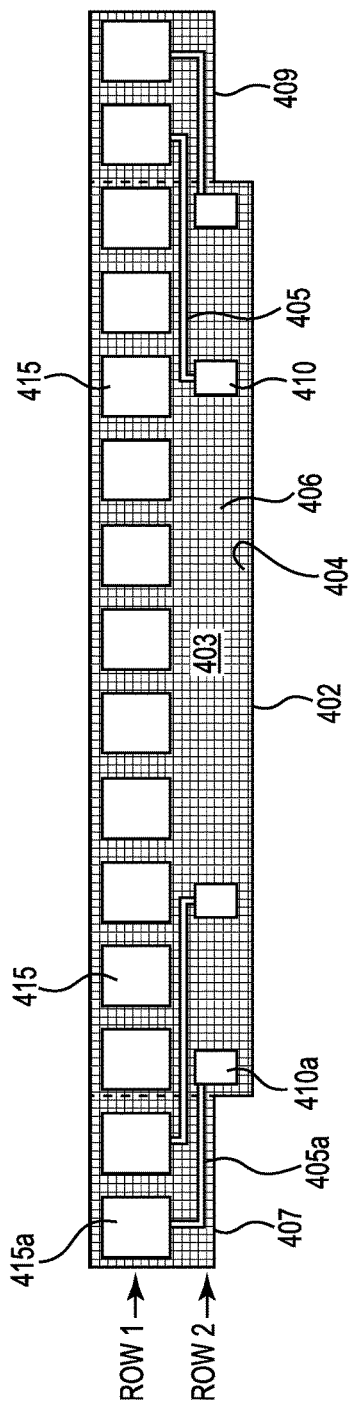
FIG. 8 is a front view of an interconnect interposer in accordance with various embodiments.
Figure 9:
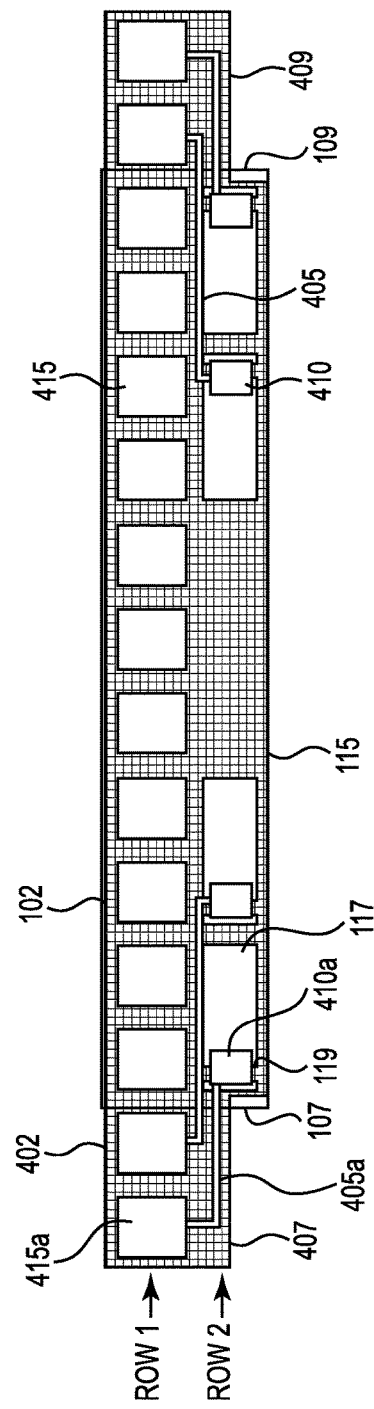
FIG. 9 illustrates the interposer of FIG. 8 connected to the trailing edge of a slider.

FIG. 8 is a front view of an interconnect interposer 402 in accordance with various embodiments. FIG. 9 illustrates the interposer 402 of FIG. 8 connected to the trailing edge 115 of a slider 102. For illustrative purposes, the interposer 402 is presented as a transparent structure so that certain features not physically situated on the front side 406 of the interposer 402 can be seen (e.g., structure 410a and at least a portion of structure 405a).

The interposer 402 shown in FIGS. 8 and 9 includes a main region 403 (region between the vertical dashed lines) from which a first peripheral wing 407 and a second peripheral wing 409 respectively extend. The main region 403 has a width about the same as the width of the slider 102. The first and second peripheral wings 407 and 409 extend beyond side surfaces 107 and 109 of the slider 102. As was discussed previously, the total width of the interposer 402 (e.g., the width of the main region 403 plus the two peripheral wings 407 and 409) can be about 1.5 to 3 times the width of the slider 102, with a maximum width about equal to that of the TGA footprint. In general, the width of the peripheral wings 407 and 409 is dictated by the total number of interposer pads 415 needed, the number of interposer pads 415 that can be accommodated within the main region 403, and the remaining number of interposer pads 415 that must be supported by the peripheral wings 407 and 409.

The interposer 402 shown in FIGS. 8 and 9 includes two rows of electrical contacts, shown as Row 1 and Row 2. Fifteen interposer pads 415 are arranged in Row 1 (top row). Eleven interposer pads 415 are situated within the main region 403. Two interposer pads 415 are situated within the first peripheral wing 407, and two interposer pads 415 are situated within the second peripheral wing 409. The interposer pads 415 are positioned on the upper portion of the interposer 402 so that the interposer pads 415 are aligned with the upper region (e.g., upper ½ or ⅓) of the slider (not shown). Although not shown, the backside 404 of the interposer 402 includes 15 electrical contacts that are aligned and connect with corresponding bond pads on the trailing edge 115 of the slider 102.

In some embodiments, it may be desirable or necessary to add more bond pads to the upper region ($R_U$) of a slider's trailing edge 115 than can be accommodated by the slider 102 due to slider width and bond pad size/pitch limitations. For reasons discussed previously, additional bond pads cannot be added to the lower region ($R_L$) of the slider's trailing edge 115 because these distant bond pads are too far away from the TGA 305 to reliably form the necessary electrical conduction paths using standard IC technology. Adding the interposer 402 shown in FIGS. 8 and 9 to the trailing edge 115 of the slider 102 provides the opportunity to reliably connect bond pads disposed in the lower region of the trailing edge 115 with the interconnects of the TGA 305.

The interposer 402 shown in FIGS. 8 and 9 includes four electrical contacts 410 positioned in Row 2 within a lower portion of the interposer 402. The electrical contacts 410 are physically positioned on the backside 404 of the interposer 402. These electrical contacts 410 are configured to electrically connect with contacts on the lower region ($R_L$) of the trailing edge 115 of the slider 102. For example, and as shown in FIG. 9, an electrical contact 410a on the backside 404 of the interposer 402 is electrically connected to a slider contact 119 (e.g., bond pad) situated within an ELG region 117 of the slider's trailing edge 115. The electrical contact 410a is electrically connected to interposer pad 415a situated on the front side 406 of the interposer 402 via a conductor 405a, which may be a trace conductor for example. The conductor 405a passes through the body of the interposer 402 and can also run along the surface of the front side 406 and/or the backside 404 of the interposer 102. It is noted that electronics can be mounted on the front side 406 of the interposer 402 (and/or the backside 404 of the first and second peripheral wings 407 and 409), such as a surface mount electronic element a diode, photodiode, transistor, amplifier, etc.).

FIG. 10 is a front view of an interconnect interposer 402 in accordance with various embodiments. FIG. 11 illustrates the interposer 402 shown in FIG. 10 connected to the trailing edge 115 of a slider 102. It is noted that the slider 102 illustrated in FIG. 11 is truncated for convenience of illustration. The interposer 402 shown in FIGS. 10 and 11 has features similar to those shown in the interposer embodiments of FIGS. 8 and 9. In the embodiment shown in FIGS. 10 and 11, the interposer 402 has a folding feature relative to the first and second peripheral wings 407 and 409. In particular, the interposer 402 includes a first fold line 420 between the main region 403 of the interposer 402 and the first peripheral wing 407. The interposer 402 also includes a second fold line 422 between the main region 403 and the second peripheral wing 409.

The first and second fold lines 420 and 422 are configured to facilitate bending of the first and second peripheral wings 407 and 409 relative to the main region 403. As can be seen in FIG. 11, the main region 403 of the interposer 402 is mounted in a parallel relationship with respect to the trailing edge 115 of the slider 102. The first peripheral wing 407 is bent at an angle of about 90° with respect to the main region 403, such that the first peripheral wing 407 is parallel with a side surface 107 of the slider 102. The second peripheral wing 409 is bent at an angle of about 90° with respect to the main region 403, such that the second peripheral wing 409 is parallel with a second side 109 of the slider 102. The first and second peripheral wings 407 and 409 can be secured to the side surfaces 107 and 109 of the slider 102 using an adhesive or other attachment approach. It is understood that at least the conductors 405 within (or on) the first and second peripheral wings 407 and 409 are flexible conductors. Limiting the width of the interposer 402 to that of the slider 102 can improve the windage characteristics of the interposer 402 relative to the configuration shown in FIGS. 8 and 9.

Figure 12:
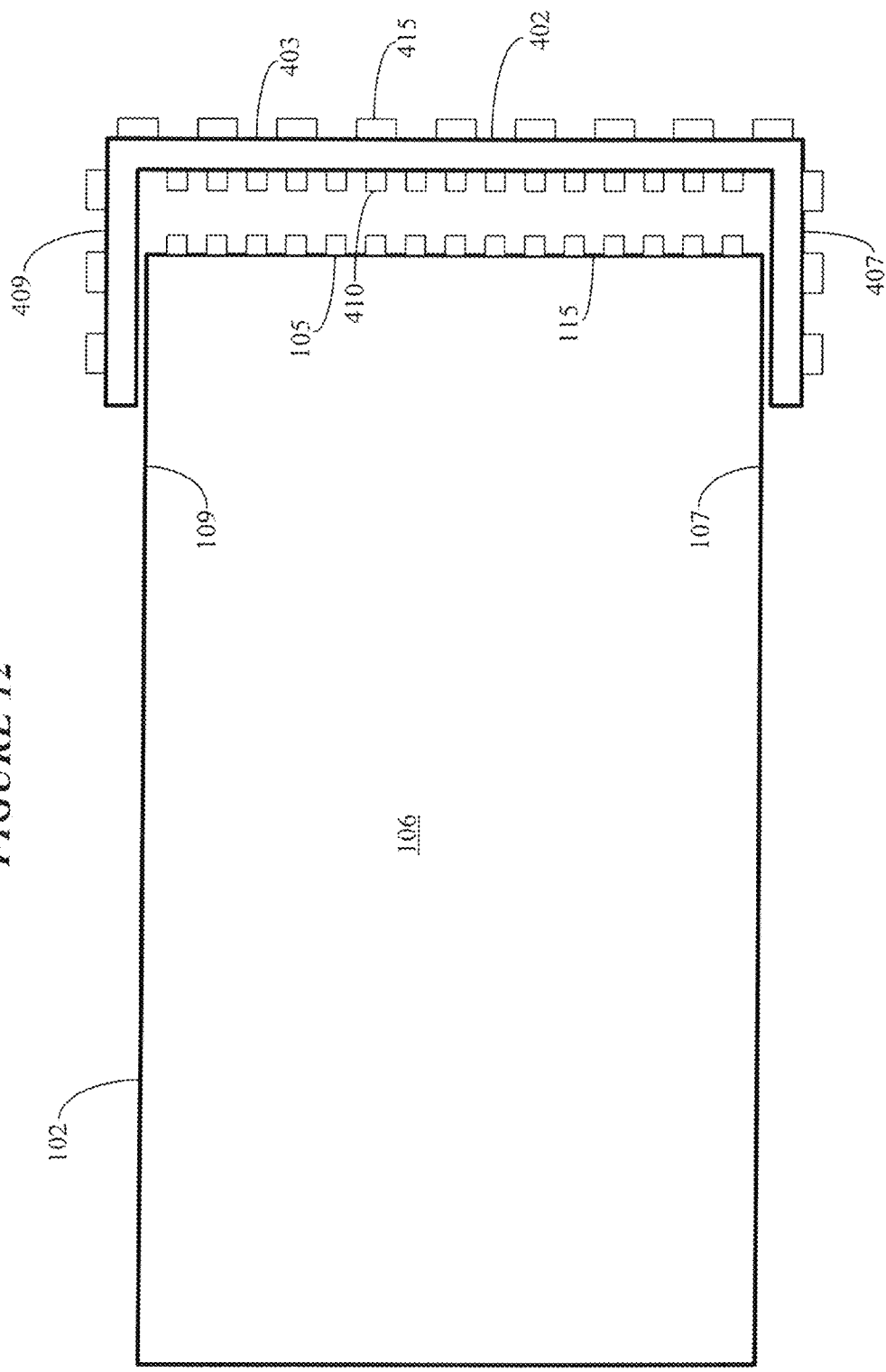
FIG. 12 shows a top view of an interconnect interposer with bent first and second peripheral wings in accordance with various embodiments.

FIG. 12 shows a top view of an interconnect interposer 402 with bent first and second peripheral wings 407 and 409 in accordance with various embodiments. In FIG. 12, the interposer 402 has a substantially C-shaped configuration, with a main region 403 parallel to the trailing edge 115 of the slider 102, the first peripheral wing 407 parallel to the first side surface 107 of the slider 102, and the second peripheral wing 409 parallel to a second side surface 109 of the slider 102. In some embodiments, the interposer 402 shown in FIG. 12 can be a rigid structure. In other embodiments, a flexible joint can be provided between the main region 403 and each of the first and second peripheral wings 407 and 409. In further embodiments, at least to the first and second peripheral wings 407 and 409 can be flexible to facilitate bending of the interposer 402 around the corners of the slider 102 where the trailing edge 115 meets the first and second side surfaces 107 and 109.

Figure 13:
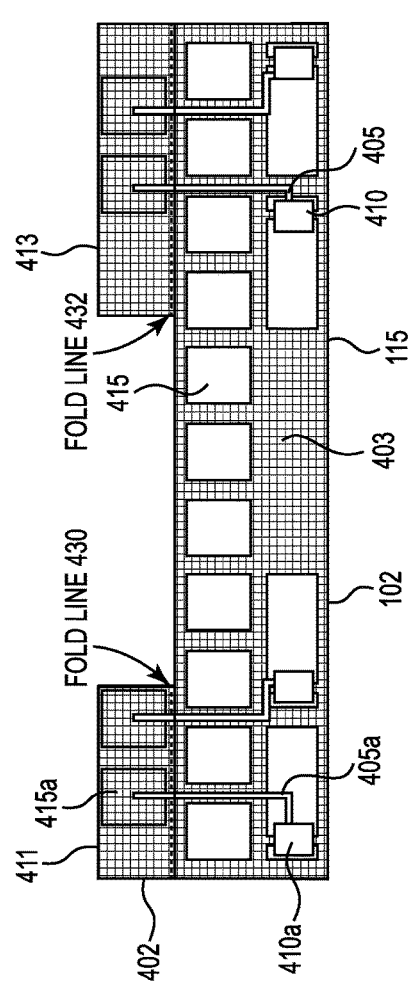
FIG. 13 is a front view of an interconnect interposer in accordance with various embodiments.
Figure 14:
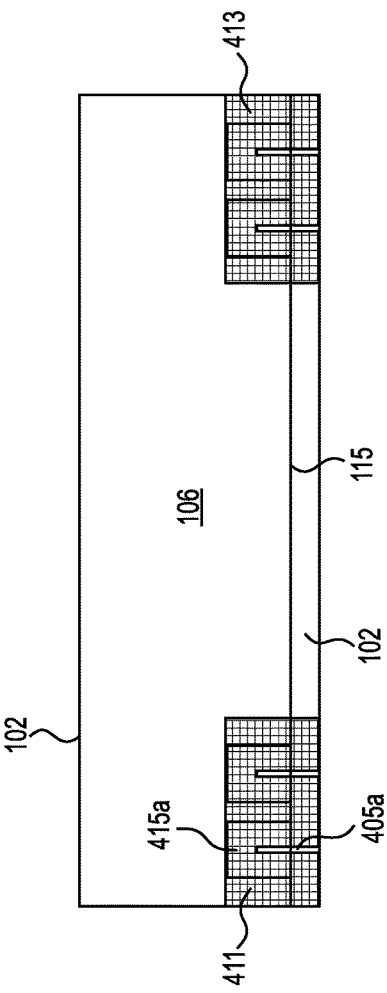
FIG. 14 illustrates the interposer shown in FIG. 13 connected to the trailing edge of a slider.

FIG. 13 is a front view of an interconnect interposer 402 in accordance with various embodiments. FIG. 14 illustrates the interposer 402 shown in FIG. 13 connected to the trailing edge 115 of a slider 102. It is noted that the slider 102 illustrated in FIG. 14 is truncated for convenience of illustration, and that the interposer 402 shown in FIGS. 13 and 14 has features similar to those shown in the interposer embodiments of FIGS. 8 and 9. In the embodiment shown in FIGS. 13 and 14, the interposer 402 has a folding feature relative to the first and second flaps 411 and 413. In particular, the interposer 402 includes a first fold line 430 between a main region 403 and the first flap 411. The interposer 402 also includes a second fold line 432 between the main region 403 and the second flaps 413.

The first and second fold lines 430 and 432 are configured to facilitate bending of the first and second flaps 411 and 413 relative to the main region 403. As can be seen in FIG. 14, the main region 403 of the interposer 402 is mounted in a parallel relationship with respect to the trailing edge 115 of the slider 102. The first flap 411 is bent at an angle of about 90° with respect to the main region 403, such that the first flap 411 is parallel with the top surface 106 of the slider 102. The second flaps 413 is bent at an angle of about 90° with respect to the main region 403, such that the second flap 413 is also parallel with the top surface 106 of the slider 102. The first and second flaps 411 and 413 can be secured to the top surface 106 of the slider 102 using adhesive or other attachment approach. It is understood that at least the conductors 405 within (or on) the first and second flaps 411 and 413 are flexible conductors. As in the case of the embodiments shown in FIGS. 10-12, limiting the width of the interposer 402 to that of the slider 102 can improve the windage characteristics of the interposer 402 relative to the configuration shown in FIGS. 8 and 9.

Figure 15:
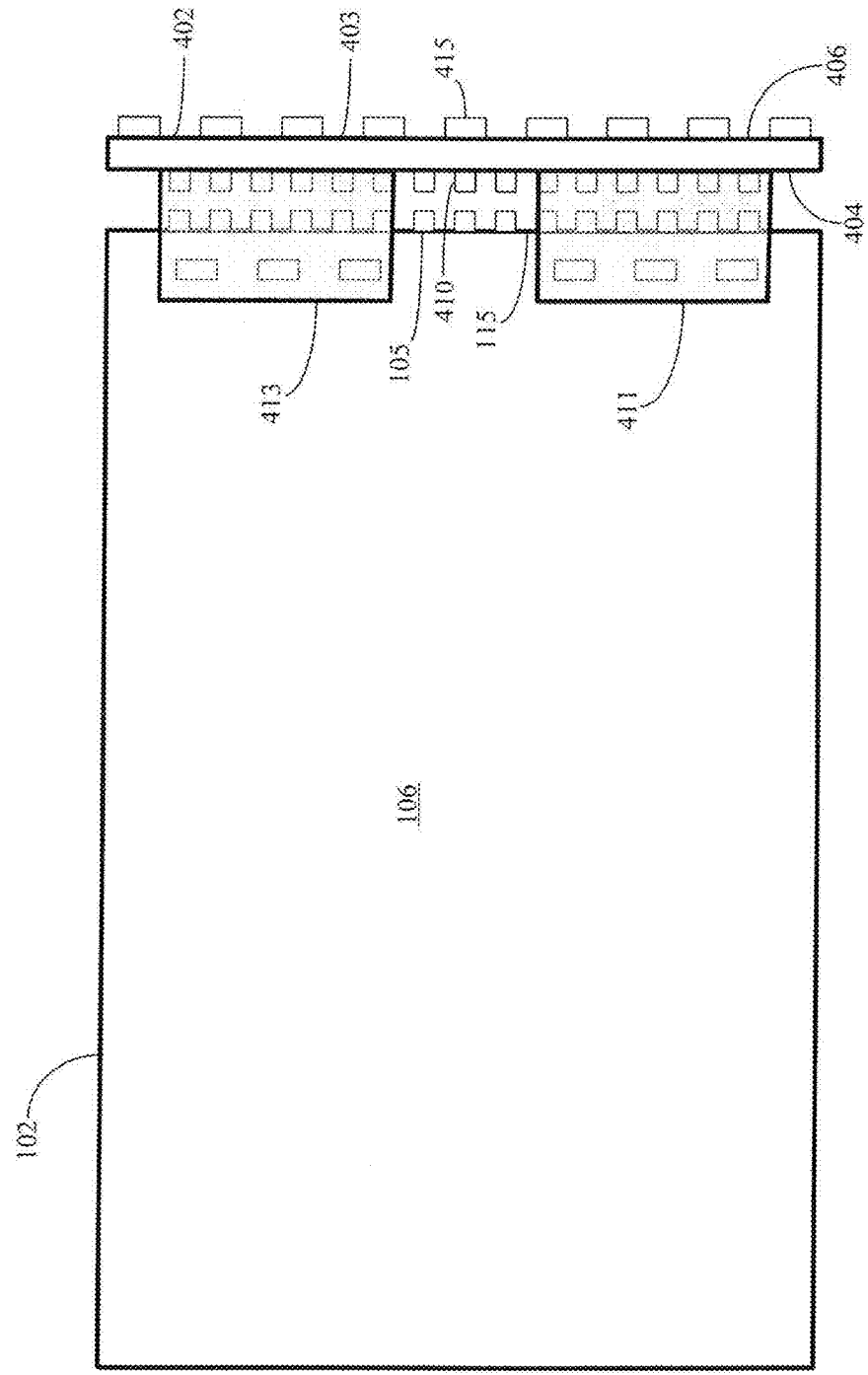
FIG. 15 shows a top view of an interconnect interposer with bent first and second flaps in accordance with various embodiments.

FIG. 15 shows a top view of an interconnect interposer 402 with bent first and second flaps 411 and 413 in accordance with various embodiments. In FIG. 15, the interposer 402 has a main region 403 parallel to the trailing edge 115 of the slider 102. The first flap 411 is parallel to the tope surface 106 of the slider 102, and the second flap 413 is also parallel to the top surface 106 of the slider 102. In some embodiments, the interposer 402 shown in FIG. 15 can be a rigid structure. In other embodiments, a flexible joint can be provided between the main region 403 and each of the first and second flaps 411 and 413. In further embodiments, at least the first and second flaps 411 and 413 can be flexible to facilitate bending of the interposer 402 around the corner of the slider 102 where the trailing edge 115 meets the top surface 106 of the slider 102.

Systems, devices or methods disclosed herein may include one or more of the features structures, methods, or combination thereof described herein. For example, a device or method may be implemented to include one or more of the features and/or processes above. It is intended that such device or method need not include all of the features and/or processes described herein, but may be implemented to include selected features and/or processes that provide useful structures and/or functionality.

Various modifications and additions can be made to the disclosed embodiments discussed above. Accordingly, the scope of the present disclosure should not be limited by the particular embodiments described above, but should be defined only by the claims set forth below and equivalents thereof.

What is claimed is:

1. An apparatus, comprising:
   a slider of a magnetic recording head, the slider comprising a media-facing surface, an upper surface opposing the media-facing surface, a leading edge, and a trailing edge;
   a plurality of electrical bond pads disposed in a spaced-apart relationship on the trailing edge of the slider; and
   an interconnect interposer connected to the trailing edge of the slider, the interposer comprising:
      a back side comprising a plurality of electrical contacts in contact with the plurality of bond pads on the trailing edge of the slider;
      a front side comprising a plurality of electrical interposer pads corresponding in number to the plurality of electrical contacts on the back side; and
      a plurality of conductors each of which electrically couples one of the plurality of electrical contacts on the back side with one of the plurality of interposer pads on the front side;
   wherein the slider has a width in a cross-track direction, and the interposer has a width in the cross-track direction that is greater than the width of the slider.

2. The apparatus of claim 1, wherein:
   the bond pads are spaced apart by a first spacing dimension;
   the interposer pads are spaced apart by a second spacing dimension; and
   the second spacing dimension is greater than the first spacing dimension.

3. The apparatus of claim 1, wherein:
   the bond pads have a surface area;
   the interposer pads have a surface area; and
   the surface area of the interposer pads is greater than that of the bond pads.

4. The apparatus of claim 1, wherein the width of the interposer is greater than the width of the slider by a factor of between about 1.5 and 3.

5. The apparatus of claim 1, wherein:
   the slider has a thickness, an upper region defining an upper half of the slider thickness, and a lower region defining a lower half of the slider thickness; and
   the interposer pads are situated on the interposer to align with the upper region of the slider.

6. The apparatus of claim 1, wherein:
   the slider has a thickness, an upper region defining an upper third of the slider thickness, and a lower region defining a lower two-thirds of the slider thickness; and
   the interposer pads are situated on the interposer to align with the upper region of the slider.

7. The apparatus of claim 1, wherein:
   the slider comprises first and second opposing edge surfaces between the media-facing surface and the upper surface;
   a first end portion of the interposer is parallel to the first edge surface; and
   a second end portion of the interposer is parallel to the second edge surface.

8. The apparatus of claim 1, wherein one or more portions of the interposer extend over the upper surface of the slider.

9. The apparatus of claim 1, wherein the interposer is attached to the trailing edge of the slider via solder between the interposer pads and the bond pads.

10. An apparatus, comprising:
    a slider of a magnetic recording head, the slider comprising a media-facing surface, an upper surface opposing the media-facing surface, a leading edge, and a trailing edge;

a plurality of electrical bond pads disposed in a spaced-apart relationship on the trailing edge of the slider, at least some of the bonds pads situated in an upper region of the trailing edge and at least some of the bond pads situated in a lower region of the trailing edge; and an interconnect interposer connected to the trailing edge of the slider, the interposer comprising:
- a back side comprising a plurality of electrical contacts in contact with the plurality of bond pads in the upper and lower regions of the trailing edge of the slider;
- a front side comprising a plurality of electrical interposer pads corresponding in number to the plurality of electrical contacts on the back side; and
- a plurality of conductors each of which electrically couples one of the plurality of electrical contacts on the back side with one of the plurality of interposer pads on the front side;

wherein the slider has a width in a cross-track direction, and the interposer has a width in the cross-track direction that is greater than the width of the slider.

11. The apparatus of claim 10, wherein:
the slider has a thickness, an upper region defining an upper half of the slider thickness, and a lower region defining a lower half of the slider thickness; and
the interposer pads are situated on the interposer to align with the upper region of the slider.

12. The apparatus of claim 10, wherein:
the slider has a thickness, an upper region defining an upper third of the slider thickness, and a lower region defining a lower two-thirds of the slider thickness; and
the interposer pads are situated on the interposer to align with the upper region of the slider.

13. The apparatus of claim 10, wherein:
the bond pads are spaced apart by a first spacing dimension;
the interposer pads are spaced apart by a second spacing dimension; and
the second spacing dimension is greater than the first spacing dimension.

14. The apparatus of claim 10, wherein:
the bond pads have a surface area;
the interposer pads have a surface area; and
the surface area of the interposer pads is greater than that of the bond pads.

15. The apparatus of claim 10, wherein the width of the interposer is greater than the width of the slider by a factor of between about 1.5 and 3.

16. The apparatus of claim 10, wherein:
the slider comprises first and second opposing edge surfaces between the media-facing surface and the upper surface;
a first end portion of the interposer is parallel to the first edge surface; and
a second end portion of the interposer is parallel to the second edge surface.

17. The apparatus of claim 10, wherein one or more portions of the interposer extend over the upper surface of the slider.

18. The apparatus of claim 10, wherein the interposer is attached to the trailing edge of the slider via solder between the interposer pads and the bond pads.

* * * * *